(12) United States Patent
Treleaven

(10) Patent No.: US 7,081,217 B2
(45) Date of Patent: Jul. 25, 2006

(54) METHOD FOR MAKING PLASTIC MATERIALS USING RECYCLABLE PLASTICS

(76) Inventor: Dan Treleaven, 6505 3rd Avenue, Delta, British Columbia (CA) V4M 2N1

( * ) Notice: Subject to any disclaimer, the term of this patent is extended or adjusted under 35 U.S.C. 154(b) by 376 days.

(21) Appl. No.: 10/167,957

(22) Filed: Jun. 13, 2002

(65) Prior Publication Data

US 2003/0230654 A1 Dec. 18, 2003

(51) Int. Cl.
 B29C 47/92 (2006.01)
 B02C 17/00 (2006.01)

(52) U.S. Cl. .................. 264/40.1; 264/211; 264/911; 264/920

(58) Field of Classification Search ............ 241/24.18; 209/580; 264/40.1, 211, 911, 920
See application file for complete search history.

(56) References Cited

U.S. PATENT DOCUMENTS

| | | | |
|---|---|---|---|
| 3,802,558 A * | 4/1974 | Rhys ........................ 209/557 |
| 3,980,180 A | 9/1976 | Jamieson |
| 4,684,488 A * | 8/1987 | Rudolph ..................... 264/411 |
| 4,919,872 A * | 4/1990 | Fintel ........................ 264/103 |
| 5,150,307 A | 9/1992 | McCourt et al. |
| 5,318,172 A * | 6/1994 | Kenny et al. ............... 209/524 |
| 5,333,739 A | 8/1994 | Stelte |
| 5,407,624 A * | 4/1995 | Engh et al. .................. 264/141 |
| 5,443,164 A * | 8/1995 | Walsh et al. ................ 209/580 |
| 5,519,925 A | 5/1996 | Ball et al. |
| 5,590,791 A | 1/1997 | Gschweitl |
| 5,603,413 A * | 2/1997 | Mitchum, Jr. ............... 209/580 |
| 5,609,676 A | 3/1997 | Von Der Eltz |
| 5,635,125 A | 6/1997 | Ternes et al. |
| 5,641,072 A * | 6/1997 | Otake ......................... 209/524 |
| 5,704,555 A | 1/1998 | Arastoopour |
| 5,718,737 A | 2/1998 | Mosch |
| 5,723,517 A * | 3/1998 | Campo et al. ............... 523/303 |
| 5,756,020 A * | 5/1998 | Locke et al. ................ 264/40.7 |
| 5,759,465 A * | 6/1998 | Ha ............................. 264/141 |
| 5,894,939 A * | 4/1999 | Frankel ...................... 209/630 |
| 5,966,217 A | 10/1999 | Roe et al. |
| 6,144,004 A | 11/2000 | Doak |
| 6,180,685 B1 | 1/2001 | Khait |
| 6,216,878 B1 | 4/2001 | Wheat |
| 6,282,858 B1 | 9/2001 | Swick |
| 6,313,422 B1 | 11/2001 | Anibas |
| 6,423,254 B1 * | 7/2002 | Bertoglio ................... 264/45.3 |
| 6,479,003 B1 * | 11/2002 | Furgiuele et al. .......... 264/176.1 |
| 6,783,715 B1 * | 8/2004 | Okamura et al. ........... 264/141 |
| 6,797,216 B1 * | 9/2004 | Furgiuele et al. .......... 264/176.1 |
| 2002/0122941 A1 * | 9/2002 | Kelley ........................ 428/401 |
| 2003/0168758 A1 * | 9/2003 | Bickel ........................ 264/40.1 |
| 2004/0091644 A1 * | 5/2004 | Kelley ........................ 428/18 |
| 2004/0155374 A1 * | 8/2004 | Hutchinson et al. ....... 264/40.1 |

* cited by examiner

*Primary Examiner*—Mark Eashoo
(74) *Attorney, Agent, or Firm*—Fasken Martineau DuMoulin LLP

(57) ABSTRACT

A method of making plastic materials, such as plastic lumber, wherein recyclable plastics are sorted into at least two categories and the recyclable plastics in each category are then shredded and chipped, extruded, and mixed with selected colour concentrates to produce the plastic materials of a selected colour. This invention allows for the control of the selected colour to enable replication of such colour of the plastic materials, regardless of any variation in colour of the recycled plastics in each category.

16 Claims, 2 Drawing Sheets

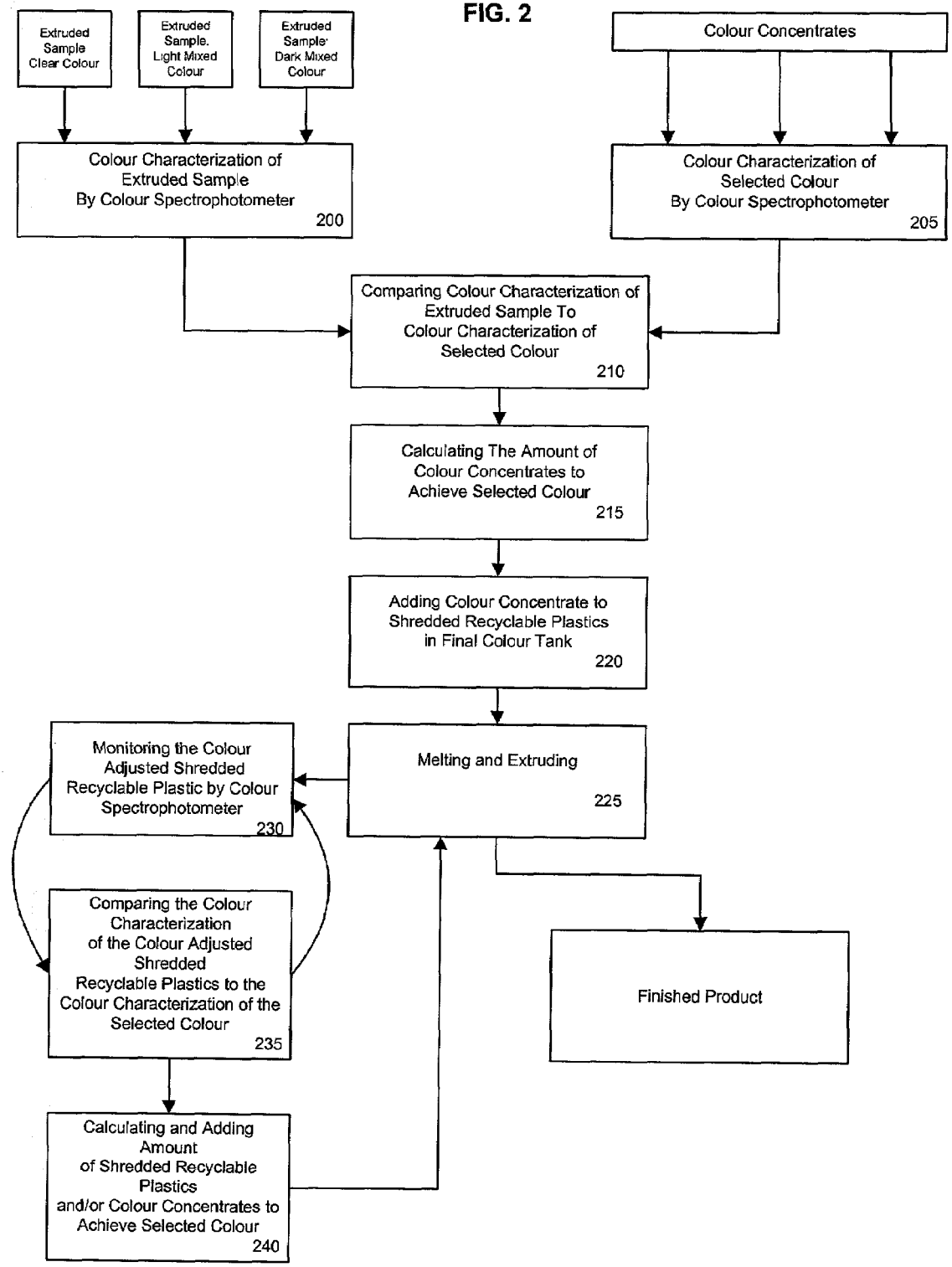

METHOD FOR MAKING PLASTIC MATERIALS USING RECYCLABLE PLASTICS

NOTICE REGARDING COPYRIGHTED MATERIAL

A portion of the disclosure of this patent document contains material subject to copyright protection. The copyright owner has no objection to the facsimile reproduction by anyone of the patent document or the patent disclosure as it appears in the public Patent Office file or records but otherwise reserves all copyright rights whatsoever.

TECHNICAL FIELD

This invention relates to manufacturing plastic materials, such as plastic lumber, of any particular colour, by using recyclable plastics of various colours and types.

BACKGROUND

Recycling programs such as curbside recycling for paper, plastic, and glass have been available in North America for many years. Most cities have these mixed recyclable products picked up and sent to a recycling depot where the recyclable products are sorted into categories by type (for example, into aluminum, tin, glass, and plastic categories).

On average, post-consumer plastic waste comprises approximately 20% by volume of all municipal waste. Recyclable plastics are usually sorted into 2 categories: clear recyclable plastics and mixed colour recyclable plastics. Clear recyclable plastics are usually sold for 15–20 times more per pound than mixed colour recyclable plastics because there is less demand for plastic materials manufactured from mixed colour recyclable plastics. A reason for this lower demand is that the colouration of plastic materials made from mixed colour recyclable plastics is inconsistent and not aesthetically pleasing to consumers. Such materials often are painted or require expensive colouring agents or other additives during the manufacturing process to mask the inconsistent colouration. Although there are manufacturers who use colouring agents when making plastic materials from mixed colour recyclable plastics, most manufacturers have not been able to continually produce plastic materials of consistent colour, in any colour. As a result, manufacturers of plastic materials are less likely to use mixed colour recyclable plastics, even though they are less costly than clear recyclable plastics.

It is an object of the invention to provide a method of making plastic materials, using the less expensive mixed colour recyclable plastics, to achieve continual production of plastic materials of consistent colour and quality.

It is a further object of the invention to provide a method of making plastic materials of any selected colour from mixed colour recyclable plastics.

SUMMARY OF THE INVENTION

The present invention is a method of making plastic materials from recyclable plastics. The process begins by sorting the recyclable plastics into a first category and a second category. The recyclable plastics may also be sorted into three categories based on colour, namely: a clear category, a light mixed colour category, and a dark mixed colour category. The recyclable plastics in a selected category are then shredded, stored in a container, and agitated. The colour of the shredded recyclable plastics is then characterized. This characterization is done by taking a sample of the shredded recyclable plastic, melting and extruding the sample, and characterizing the colour of the extruded sample with a colour spectrophotometer. Using the colour characterization, the colour of the shredded recyclable plastics can then be adjusted to a selected colour. This adjustment is done by characterizing the selected colour by using a colour spectrophotometer and comparing the characterization of the selected colour with the characterization of the extruded sample to determine the type and amount of colour concentrates needed to adjust the colour of the shredded recyclable plastics. These colour concentrates are then added to the shredded recyclable plastics, which are then melted and extruded to produce plastic materials in a uniform and consistent colour.

BRIEF DESCRIPTION OF FIGURES

Further objects, features, and advantages of the present invention will become more readily apparent to those skilled in the art from the following description of the invention when taken in conjunction with the accompanying drawings, in which:

FIG. 2 is a flow chart showing the change of colour process therein.

DETAILED DESCRIPTION OF PREFERRED EMBODIMENTS

Figure 1:
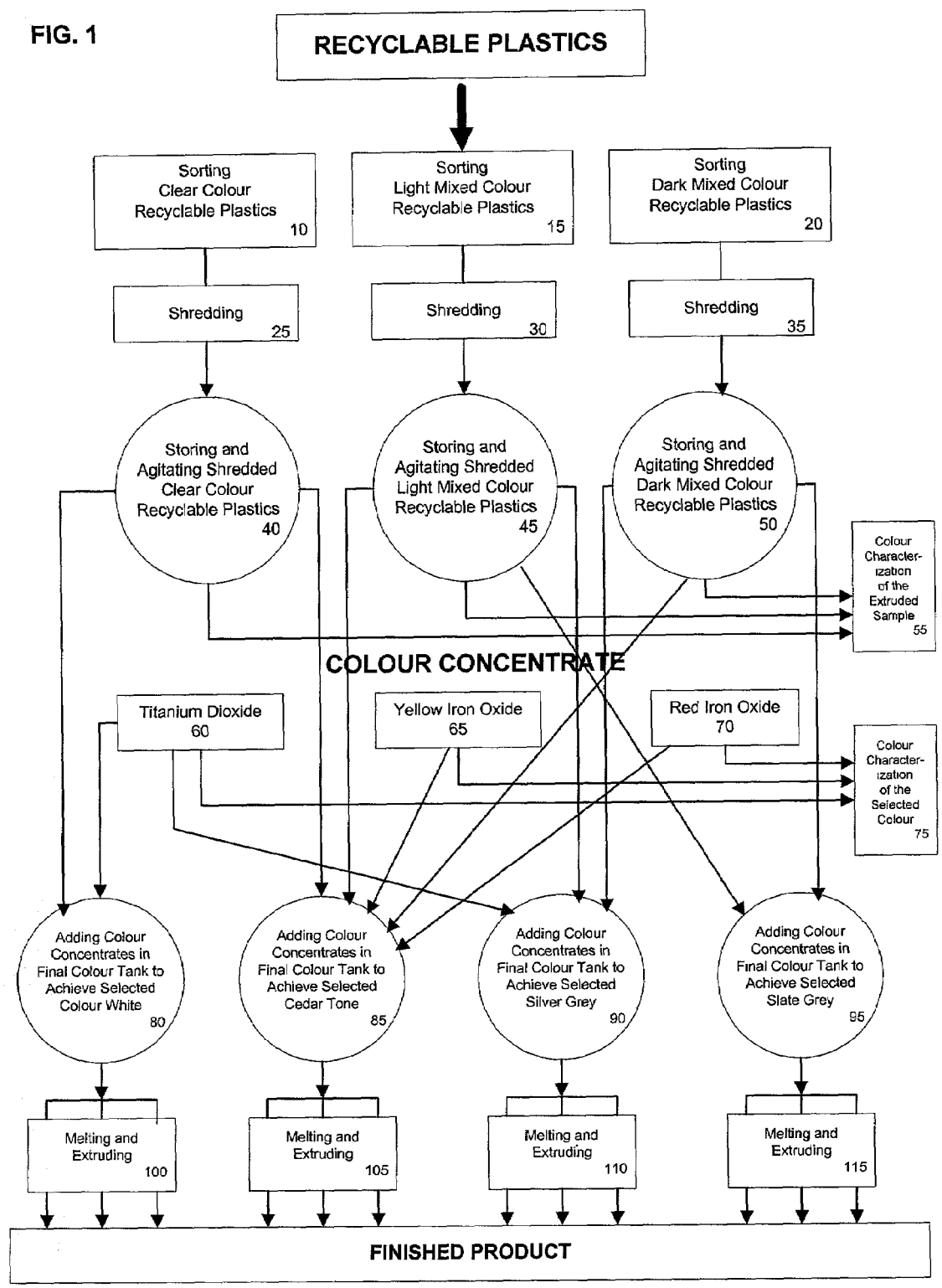
FIG. 1 is a flow chart of a method of making plastic materials from recyclable plastics, according to the invention.

The following detailed description will be made with reference to the desired method of making plastic materials, such as plastic lumber, from recyclable plastics. Recyclable plastics typically include post-consumer plastic waste (comprised of milk containers, plastic bags, and various bottles for household chemicals, soft drinks, and food items) and post-industrial plastic waste (comprised of packaging materials). The embodiment of the method disclosed herein of making plastic materials from recyclable plastics uses post-consumer plastic waste, but the method can be adapted to use other recyclable plastics, including industrial plastic waste. The method of the present invention can easily be adapted to make any recycled plastic products such as plastic shingles and plastic tiles.

As illustrated in FIG. 1, the process begins with sorting of the recyclable plastics, based on colour, into three categories: clear colour, light mixed colour, and dark mixed colour (steps 10, 15, and 20, respectively). Examples of recyclable plastics usually in the clear colour category include milk containers and juice containers. Examples of recyclable plastics usually in the light mixed colour category include margarine tubs and household cleaning product bottles. Examples of recyclable plastics usually in the dark mixed colour category include laundry detergent containers and motor oil containers. Alternatively, depending on the availability of the recyclable plastics and the cost of sorting, the recyclable plastics can be sorted into two categories: clear colour and mixed colour. The use of two categories, rather than three, will require more colour concentrates be used. In the further alternative, the recyclable plastics can also be sorted based on other characteristics such as the type of plastic. Recyclable plastics are made of a wide variety of polymers. For example, milk containers are typically made of high-density polyethylene (HDPE), bottle caps are typically made of polyvinyl chloride (PVC), and soft drink bottles are typically made of polyethylene terephthalate (PET). Any sorting system can be used to sort the recyclable plastics into a selected category. Manual sorting and sorting by x-ray detection are two possible methods of sorting the recyclable plastics.

The sorted recyclable plastics in each category are then reduced in size by using machinery such as industrial shredders and granulators. Other methods of reducing the size of the sorted recyclable plastics can be used. A preferred method of reducing the size of the sorted recyclable plastics in the present invention is by way of using an industrial shredder which shreds the recyclable plastics first, and then further reduces the size of the shredded recyclable plastics by chipping them with rotating knives into a size suitable for the melting and extrusion process (steps 25, 30, and 35, respectively in FIG. 1). The suitable size of the shredded recyclable plastics is determined by the conveying and processing equipment. Typically, the most suitable size of the shredded recyclable plastics ranges from 1/16" to 1".

The shredded recyclable plastics in each category are then stored in separate holding containers with an agitation system to render an average colour of the shredded recyclable plastics (steps 40, 45, and 50, respectively in FIG. 1). An agitation system is a means for mixing the shredded recyclable plastics. Any method of mixing the shredded recyclable plastics can be used, such as, but not limited to, augers, mechanical paddle wheels, or conveyors. Preferably, the holding containers should be large tanks that are at least 5000 gallons so that the addition of new shredded recyclable plastics will not significantly affect the average colour. However, other sizes of tanks may be used. The preferred method of mixing the shredded recyclable plastics is by way of using an auger. An auger is device with a screw-like component that spans approximately 1/3 of the diameter of the tank and operates by twisting the shredded recyclable plastics up from the bottom of the tank and mixing them with the shredded recyclable plastics in the side of the tank. This method of mixing allows for an even distribution of the shredded recyclable plastics to render an average colour.

A representative sample of the shredded recyclable plastics is then taken from each category and melted and extruded for colour characterization of the sample (step 55 in FIG. 1). In this document, colour characterization is defined as a determination of the exact composition or "fingerprint" of a colour. As illustrated in FIG. 2, colour characterization is typically effected by using a colour spectrophotometer to measure the opacity (via light transmission) and the colour (via reflection in the visible spectrum) to determine the exact colour composition and colour strength of the extruded sample. Alternatively, other methods of colour characterization, other than the use of a colour spectrophotometer, can be used to determine the colour composition of the sample. The preferred method of colour characterization of the extruded sample in the present invention is by way of using a colour spectrophotometer to determine the composition of the average colour of each category of shredded recyclable plastics (step 200 in FIG. 2).

Measuring the opacity of the extruded sample determines the quantity of colour pigments present in the extruded sample. Measuring the colour of the extruded sample determines the density of the colour pigments present in the extruded sample. The measure of opacity and colour of the extruded sample can then be used to establish an optimal level of colour pigment quantity and density for a given weight of shredded recyclable plastics. In this document, an optimal level of colour pigment means the ideal ratio of colour pigment quantity and colour pigment density for a given weight of shredded recyclable plastics. Establishing and maintaining an optimal level of colour pigment will assist in controlling the quality of the shredded recyclable plastics as the quality may be reduced if the colour pigment quantity and density for a given weight exceeds the optimal level of colour pigment. The quality of the shredded recyclable plastics can be controlled by comparing the colour pigment quantity and density of the shredded recyclable plastics to the optimal level of colour pigment and calculating the amount of clear shredded recyclable plastics that should be added to reduce the colour pigment quantity and density of the shredded recyclable plastics to the optimal level of colour pigment (step 230 in FIG. 2). Clear shredded recyclable plastics are added because they do not contain any pigments. The preferred method of calculating the amount of clear shredded recyclable plastics that will be added to the shredded recyclable plastics is by using commercial colour computer program available in the art.

Colour concentrates are then added to at least one category of the shredded recyclable plastics to adjust the colour of the shredded recyclable plastics in the category to any selected colour. Colour concentrates are a mixture of colouring agents that can be used to adjust the colour of the shredded recyclable plastics to a selected colour (steps 60, 65, and 70 in FIG. 1). For example, if the selected colour is Cedar Tone, the colour concentrate could contain a mixture of red iron oxide colouring agent and yellow iron oxide colouring agent. Colouring agents are supplied in either dry or liquid form. Although both forms can be used, the preferred form of colouring agents for the present invention is in a pellet or flake form. The colour concentrates required to achieve the selected colour of the shredded recyclable plastics will be determined by comparing the characterization of the extruded sample with the characterization of the selected colour (step 210 in FIG. 2). For example, if the selected colour is Silver Grey, the characterization of Silver Grey will be compared to the characterization of titanium dioxide colouring agent and a combination of light coloured and dark coloured shredded recyclable plastics to determine the amount of titanium dioxide colouring agent required to achieve Silver Grey. Characterization of the selected colour can also be done by using a colour spectrophotometer (step 75 in FIG. 1 or step 205 in FIG. 2). A database of the characterizations of the selected colours can be created for ease of determining the colour concentrates required for each selected colour. The calculation of the amount of colour concentrates required to adjust the shredded recyclable plastics to the selected colour can be ascertained by using commercial software available from colour spectrophotometer companies. For example, if the selected colour is White, the computer software can refer to its database of characterized selected colours and calculate the amount of titanium dioxide colouring agent required to add to the clear shredded recyclable plastics to achieve White. A database of the characterizations of the shredded recyclable plastics can also be created. For example, in the case of Slate Grey, the computer software can refer to its database of characterized colours of shredded recyclable plastics and calculate the appropriate mix of light coloured and dark coloured shredded recyclable plastics to achieve Slate Grey. This would require no colour concentrate and have the benefit of lower cost.

Optionally, a sample of the colour adjusted shredded plastics can be melted and extruded for colour characterization to determine if the selected colour has been achieved, and repeating the process if necessary. Other properties of the colour adjusted shredded plastics may also be determined from this extruded sample.

Once the amount of colour concentrates to adjust the colour of the shredded recyclable plastics is calculated (step 215 in FIG. 2), the colour concentrates are then added to the category of the shredded recyclable plastics in a final colour tank (steps 80, 85, 90, and 95 in FIG. 1 or step 220 in FIG. 2). The final colour tanks are typically 5000 gallon metal tanks, which would also be agitated to ensure the blending of colour concentrates with the shredded recyclable plastics. Alternatively, the colour concentrates can be added to the shredded recyclable plastics during the melting and extrusion process. Preferably, the colour concentrates are dispersed by the extruder during the melting process which assists in distributing the colour concentrates equally (steps 100, 105, 110, and 115 in FIG. 1 or step 225 in FIG. 2). The colour adjusted shredded recyclable plastics are then cooled and reduced in size by using a process similar to that described above with respect to reducing the size of the sorted recyclable plastics. The shredded colour adjusted recyclable plastics are then melted and extruded again to ensure even distribution of the colour concentrates. The adjusted colour of the shredded recyclable plastic should be periodically or constantly measured by using a colour spectrophotometer during the melting and extrusion process to ensure that the selected colour is achieved and maintained (step 230 in FIG. 2). More shredded recyclable plastics or colour concentrates or both may be added as required to achieve the selected colour (step 240 in FIG. 2). Preferably, the process of measuring the selected colour during the melting and extrusion process is controlled by an automated feedback system that would continually compare the colour characterization of the adjusted colour of the shredded recyclable plastics and the colour characterization of the selected colour (step 235 in FIG. 2). Ideally, a computer program will then calculate the amount of shredded recyclable plastics or colour concentrates required so that the colour characterization of the adjusted colour is the same as the colour characterization of the selected colour (step 240 in FIG. 2). Any system can be used to measure and add the calculated amount of shredded recyclable plastics or colour concentrates to the shredded recyclable plastics but the preferred method is by using a Programmable Logic Controller (PLC). The PLC takes the information generated by the computer program and measures and adds the calculated amount of shredded recyclable plastics or colour concentrates to the shredded recyclable plastics through a series of valves. Once the colour of the shredded recyclable plastics has been adjusted, the shredded recyclable plastics are then melted and extruded.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. A method of making plastic materials from recyclable plastics, comprising:
    (a) sorting said recyclable plastics into a first category and a second category;
    (b) shredding said recyclable plastics in said first category and said second category;
    (c) characterizing the colour of said shredded recyclable plastics in said first category;
    (d) based on said characterization, adding a calculated amount of shredded recyclable plastics from said second category to adjust said colour of said shredded recyclable plastics in said first category to a selected colour; and
    (e) melting and extruding at least a portion of said colour adjusted recyclable plastics in said first category.

2. The method of claim 1 wherein the colour of said shredded recyclable plastics in said first category is further adjusted by:
    (d.1) comparing said characterization of said selected colour with said characterization of said extruded sample;
    (d.2) from said comparison, and said calculated amount of shredded recyclable plastics from said second category, determining an amount of colour concentrates to adjust said colour of said shredded recyclable plastics in said first category to said selected colour; and
    (d.3) adding said determined amount of colour concentrates to said shredded recyclable plastics in said first category.

3. The method of claim 2 wherein said second category of shredded recyclable plastics are clear plastics.

4. The method of claim 3 wherein the colour of said shredded recyclable plastics in said first category is characterized by extruding a sample of said shredded recyclable plastics in said first category; and characterizing the colour of said extruded sample by a colour spectrophotometer measuring a quantity of colour pigments of said extruded sample and a density of colour pigments of said extruded sample.

5. The method of claim 3 wherein the colour spectrophotometer measures a quantity of colour pigments of said extruded sample and a density of colour pigments of said extruded sample.

6. The method of claim 1 wherein said recyclable plastics are further sorted into a third category.

7. A method of making plastic materials from recyclable plastics, comprising:
    (a) sorting said recyclable plastics into a first category and a second category;
    (b) shredding said recyclable plastics in said first category;
    (c) characterizing the colour of said shredded recyclable plastics in said first category by:
        (c.1) extruding a sample of said shredded recyclable plastics in said first category; and
        (c.2) characterizing the colour of said extruded sample by a colour spectrophotometer measuring a quantity of colour pigments of said extruded sample and a density of colour pigments of said extruded sample;
    (d) using said characterization to adjust said colour of said shredded recyclable plastics in said first category to a selected colour;
    (e) establishing an optimal level of said quantity and said density of said extruded sample; and
    (f) melting and extruding at least a portion of said colour adjusted recyclable plastics in said first category; and
    (g) controlling the quality of said shredded recyclable plastics by:
        (g.1) comparing the opacity and the density of the colour of said extruded sample to said optimal level;
        (g.2) determining if said opacity and said density of the colour of said extruded sample exceeds said optimal level; and (g.3) adding a calculated amount of clear shredded recyclable plastics to said shredded recyclable plastics.

8. The method of claim 7, wherein said selected colour is characterized by said colour spectrophotometer.

9. The method of claim 8 wherein characterization of said selected colour is recorded in a database.

10. The method of claim 9, wherein said colour of said shredded recyclable plastics in said first category is adjusted by:
   (d.1) comparing said characterization of said selected colour with said characterization of said extruded sample;
   (d.2) determining an amount of colour concentrates to adjust said colour of said shredded recyclable plastics in said first category to said selected colour; and
   (d.3) adding said amount of colour concentrates to shredded recyclable plastics in said first category.

11. The method of claim 10 wherein the colour of said colour adjusted recyclable plastics is constantly measured by the colour spectrophotometer during the melting and extruding process.

12. The method of claim 7 wherein said recyclable plastics are sorted into a clear category and a mixed colour category.

13. The method of claim 7 wherein said recyclable plastics are sorted into a clear category, a light mixed colour category, and a dark mixed colour category.

14. The method of claim 7 wherein said shredded recyclable plastics in said first category measure between {fraction (1/16)}" to 1".

15. The method of claim 7 wherein said shredded recyclable plastics in each of said categories are stored and agitated.

16. The method of claim 7 wherein the colour of said colour adjusted recyclable plastics is characterized by:
   (d.1) extruding a sample of said colour adjusted recyclable plastics; and
   (d.2) characterizing said colour of said colour adjusted recyclable plastics by a colour spectrophotometer.

* * * * *